US006281324B1

(12) United States Patent
Nakamura et al.

(10) Patent No.: US 6,281,324 B1
(45) **Date of Patent: *Aug. 28, 2001**

(54) SEMICONDUCTIVE BELT

(75) Inventors: Masao Nakamura; Toshihiko Tomita; Masakazu Sugimoto; Junichi Nakazono; Toshiaki Iwamoto, all of Osaka (JP)

(73) Assignee: Nitto Denko Corporation, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/469,160

(22) Filed: Dec. 21, 1999

(30) Foreign Application Priority Data

Dec. 21, 1998 (JP) ........................................ 10-376392

(51) Int. Cl.$^7$ ........................ C08G 73/10; B32B 3/00; B32B 7/00; B32B 27/00

(52) U.S. Cl. .................... 528/170; 528/353; 428/36.92; 428/220; 428/332; 428/473.5

(58) Field of Search ........................ 528/353, 170; 428/473.5, 36.92, 332, 220

(56) References Cited

U.S. PATENT DOCUMENTS

| | | | | |
|---|---|---|---|---|
| 5,079,121 | * | 1/1992 | Facci et al. | 430/62 |
| 5,411,779 | * | 5/1995 | Nakajima t al. | 428/36.91 |
| 5,525,446 | * | 6/1996 | Sypula et al. | 430/47 |
| 5,665,802 | * | 9/1997 | Maki et al. | 524/141 |
| 5,794,110 | * | 8/1998 | Kasai et al. | 399/299 |
| 5,922,440 | * | 7/1999 | Schlueter, Jr. et al. | 428/195 |
| 6,052,550 | * | 4/2000 | Thernton et al. | 399/237 |
| 6,066,400 | * | 5/2000 | Law et al. | 428/412 |
| 6,118,968 | * | 9/2000 | Schlueter, Jr. et al. | 399/333 |

FOREIGN PATENT DOCUMENTS

| | | | |
|---|---|---|---|
| 05077252A | * | 3/1993 | (JP) . |
| 05200904A | * | 8/1993 | (JP) . |
| 05345368A | * | 12/1993 | (JP) . |
| 06095521A | * | 4/1994 | (JP) . |

* cited by examiner

*Primary Examiner*—P. Hampton-Hightower
(74) *Attorney, Agent, or Firm*—Sughrue, Mion, Zinn, Macpeak & Seas, PLLC

(57) ABSTRACT

A semiconductive belt comprising a polyimide film having a volume resistivity of $10^9$ Ωcm to $10^{16}$ Ωcm and a surface resistivity of $10^{10}$ Ω to $10^{17}$ Ω at 25° C. and 60% RH, wherein the amount of change of the surface resistivity between 30° C. and 85% RH and 10° C. and 15% RH in terms of common logarithm being is 1.0 or smaller.

6 Claims, No Drawings

SEMICONDUCTIVE BELT

FIELD OF THE INVENTION

The present invention relates to a semiconductive belt being excellent in environmental stability of electric characteristics and durability, which can be preferably used in an electronic photographic recording apparatus as an intermediate transfer belt to transfer an image to a recording sheet or a transfer conveyance belt to both transfer an image on an image carrier to a recording sheet provided on the belt and convey the recording sheet having the image transferred.

BACKGROUND OF THE INVENTION

In order to elongate the lifetime of apparatuses arranged to form and record an image according to the electrophotographic method such as copying machines, laser printers, video printers, facsimile machines and their composite systems, a method in which the image on an image carrier is temporarily transferred to an intermediate transfer belt, and the transferred image is then fixed on a recording sheet has been investigated as an alternative to a method in which an image, composed of a recording material such as toner, formed on an image carrier such as a photosensitive drum is directly fixed to a recording sheet. Furthermore, a transfer method in which the recording sheet, on which the image is transferred, is conveyed has been investigated.

Hitherto, a semiconductive belt which can be used as the intermediate transfer belt is composed of a polyimide film containing an electrically conductive filler to have a volume resistivity of $1^{13}$ Ωcm to $10^{13}$ Ωcm as described in JP-A-5-77252 (the term "JP-A" as used herein means unexamined Japanese patent publication). The use of the polyimide film overcome problems of conventional semiconductive belts (JP-A-5-200904, JP-A-5-345368 and JP-A-6-95521) composed of a film made of vinylidene fluoride, ethylene-tetrafluoroethylene copolymer or polycarbonate, i.e., occurrence of a crack etc. at the end of the belt due to insufficient mechanical characteristics (e.g., strength and wear and abrasion resistance) and deformation of the transferred image caused by a load applied at driving.

However, the conventional semiconductive belts comprising the polyimide film are practically unsatisfactory in the environmental stability of the electric characteristics and durability. That is, the electric characteristics such as surface resistivity undesirably vary depending on external environment such as temperature and humidity. Furthermore, the electric characteristics largely vary with the long-term use. When the conventional semiconductive belt is used as the intermediate transfer belt or the transfer conveyance belt, there are problems such as transfer unevenness of the toner image transferred and developed on the recording sheet or separation failure of the recording sheet having an image transferred from the belt.

SUMMARY OF THE INVENTION

Accordingly, an object of the present invention is to provide a semiconductive belt which has excellent mechanical characteristics such as strength attributable to a polyimide film, is excellent environmental stability of electric characteristics such as surface resistivity so that electric characteristics hardly vary depending on external environment, enables transfer of a good image onto a recording sheet free from deformation of a toner image and transfer unevenness, and good separation of the recording sheet being conveyed, even when it is used as an intermediate transfer belt or a transfer conveyance belt of an electrophotographic recording apparatus, and retains such characteristics for a long time.

According to one aspect of the present invention, there is provided a semiconductive belt comprising a polyimide film having a volume resistivity of $10^9$ Ωcm to $10^6$ Ωcm and a surface resistivity of $10^{10}$ Ω to $10^{17}$ Ω at 25° C. and 60% RH (relative humidity), wherein the amount of change of the surface resistivity between 30° C. and 85% RH and 10° C. and 15% RH in terms of common logarithm is 1.0 or smaller.

According to the present invention, a semiconductive belt can be obtained which has excellent mechanical characteristics attributable to the polyimide film such as strength and non-elongation characteristic, is excellent environmental stability of electric characteristics such as surface resistivity so that electric characteristics hardly vary depending on external environment, enables transfer of a good image onto a recording sheet free from deformation of a toner image and transfer unevenness, and good separation of the recording sheet being conveyed, even when it is used as an intermediate transfer belt or a transfer conveyance belt of an electrophotographic recording apparatus, and retains such characteristics for a long time.

Other objects of the invention will be apparent from the following detailed descriptions.

DETAILED DESCRIPTION OF THE INVENTION

A semiconductive belt according to the present invention comprises a polyimide film having a volume resistivity of $10^9$ Ωcm to $10^{16}$ Ωcm and a surface resistivity of $10^{10}$ Ω to $10^{17}$ Ω at 25° C. and 60% RH, wherein the amount of change of the surf ace resistivity between 30° C. and 85% RH and 10° C. and 15% RH in terms of common logarithm is 1.0 or smaller.

The polyimide film can be formed, for example, by a method which comprises developing a solution of polyamic acid prepared by polymerizing tetracarboxylic dianhydride or its derivative and diamine in a solvent by a proper developing method, drying the developed layer to obtain a film-like molding, and heating the molding to convert polyamic acid into imide.

Tetracarboxylic dianhydride and diamine for preparing polyamic acid can be selected arbitrarily.

Examples of tetracarboxylic dianhydride include a compound represented by the following general formula:

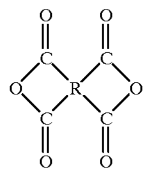

where R is a tetravalent aromatic group, aliphatic group, cyclic aliphatic group or a composite group of these groups, which may have substituent(s).

Examples of tetracarboxylic dianhydride include pyromellitic dianhydride (PMDA), 3,3',4,4'-benzophenone tetracarboxylic dianhydride, 3,3',4,4'-biphenyl tetracarboxylic dianhydride (BPDA), 2,3,3',4'-biphenyl teteracarboxylic dianhydride, 2,3,6,7-naphthalene teteracarboxylic dianhydride and 1,2,5,6-naphthalene teteracarboxylic dianhydride.

Examples of tetracarboxylic dianhydride further include 1,5,8-napthalene tetracarboxylic dianhydride, 2,2'-bis (3,4-dicarboxyphenyl) propane dianhydride, bis (3,4-dicarboxyphenyl) sulfone dianhydride, perylene-3,4,9,10-tetracarboxylic dianhydride, bis (3,4-dicarboxyphenyl) ether dianhydride and ethylene tetracarboxylic dianhydride.

Examples of the diamine include 4,4'-diaminodiphenyl ether (DDE), 3,3'-diaminodiphenylether, 4,4'-diaminediphenyl methane, 3,3'-diaminodiphenyl methane, 3,3-dichlorobenzidine, 4,4'-aminodiphenyl sulfide, 3,3'-diaminediphenyl sulfone, 1,5-diaminonaphthalene, m-pheylene diamine, p-phenylene diamine (PDA), 3,3'-dimethyl-4,4'-diaminobiphenyl and benzidine;

3,3'-dimethylbenzidine, 3,3'-dimethoxybenzidine, 4,4'-diaminephenyl sulfone, 4,4'-diaminodiphenyl sulfide, 4,4'-diaminodiphenyl sulfone, 2,4-bis (β-amino-t-butyl) tolene, bis (p-β-amino-t-butylphenyl) ether, bis (p-β-methyl-δ-aminophenyl) benzene, bis-p-(1,1-dimethyl-5-amiopentyl) benzene, 1-isopropyl-2,4-m-phenylene diamine, m-xylylene diamine and p-xylylene diamine;

diamine include di (p-aminocyclohexyl) methane, hexmethylene diamine, hepthamethylene diamine, octmethylene diamine, nonamethylene diamine, decamethylene diarmine, diaminopropyltetramethylene diamine, 3-metylheptamethylene diamine, 4,4-dimethyheptamethylene diamine, 2,11-diaminododecane, 1,2-bis-(3-aminopropoxy) ethne, 2,2-dimethylpropylene diamine, 3-metoxyhexamethylene diamine, 2,5-dimethylhexamethylene diamine, 2,5-dimethylheptamethylene diamine; and 3-methylheptamethylene diamine, 5-methylnonamethylene diamine, 2,17-diaminoeicosadecane, 1,4-diaminocyclohexane, 1,10-diamino-1,10-dimethyldecane, 1,12-diamino-octdecane, 2,2-bis[4-(4-aminophenoxy)phenyl]propane, piprazine, $H_2N(CH_2)_3O(CH_2)_2O(CH_2)NH_2$, $H_2N(CH_2)_3S(CH_2)_3$ $NH_2$ and $H_2N(CH_2)_3N(CH_3)$ $(CH_2)_3NH_2$.

The solvent which can be used in the polymerization of tetracarboxylic dianhydride and diamine can be selected arbitrarily, but a polar solvent is preferred from the standpoint of dissolving properties. Examples of the polar solnt include N,N-dialkylamide, such as N,N-dimethylformamide, N,N-dimethylacetoamide, N,N-diethylformamide or N,N-diethyl acetoamide; N,N-dimethylmethoxyacetoamide, dimethylsulfoxide, hexamethylphosphoryl triamide, N-methyl-2-pyrrolidone (NMP), pyridine, dimethylsulfone, tetramethylene sulfone and dimthyltetramethylene sulfone. Preferred is a polar solvent which can be easily removed from polyamic acid solution by a proper means such as evaporation, substitution or diffusion. If necessary, phenols (e.g., cresol, phenol or xylenol), benzonitrile, dioxane, hexane, benzene or toluene may be used together with the foregoing solvent. The use of water is undesirable because the presence of water causes hydrolysis of polyamic acid to reduce the molecular weight thereof so that the finally obtained polyimide has a lowered strength.

Tetracarboxylic dianhydride or a derivative thereof, diamine, the polar solvent, and the other solvent, which can be used in the preparation of polyamic acid, each may be used singly or as a mixture of two or more. In general, tetracarboxylic dianhydride and diamine are used in about the same moles, but, the ratio of tetracarboxylic dianhydride and diamine is not limited thereto. The concentration of the monomer at the start of the reaction may be determined arbitrarily according to reaction conditions or the like, but is generally from about 5 wt % to 30 wt %. The reaction temperature is generally 80° C. or less, preferably from 5° C. to 50° C.

As the reaction proceeds, the viscosity of the solution is raised. From a viewpoint of improvement in heat resistance of the belt to be obtained finally, it is preferable to use a polyamic acid solution having a logarithmic viscosity η of 0.5 or greater as a result of the reaction. The time required to obtain such a polyamic acid solution is usually 0.5 hour to 10 hours under the above-described reaction conditions. The logarithmic viscosity η can be calculated in accordance with the following equation. A capillary viscometer is used to measure a dropping time of the polyamic acid solution (time t1) and a dropping time of the solvent (time t0), and time t0 and t1 are used in the following equation to obtain a logarithmic viscosity η:

$$\eta = \mathrm{In}(t1/t0)/C$$

wherein C is the concentration (g/d1) of polyamic acid in the solution.

The polyimide film for forming the semiconductive belt has a volume resistivity of $10^9$ Ωcm to $10^{16}$ Ωcm and a surface resistivity of $10^{10}$ Ω to $10^{17}$ Ω in a standard state, that is, at 25° C. and 60% RH. Moreover, the amount of change of the surface resistivity between 30° C. and 85% RH and 10° C. and 15% RH in terms of common logarithm is 1.0 or smaller. The use of such a polyimide film can provide a semiconductive belt having satisfactory electric characteristics required for the intermediate transfer belt or the transfer conveyance belt of the electrophotographic recording apparatus and exhibiting environmental stability of electric characteristics.

If the volume resistivity in the standard state is lower than $10^9$ Ωcm or if the surface resistivity in the standard state is lower than $10^{10}$ Ω, an excessively large electric current flows between the image carrier and the intermediate transfer belt or like, so that the recording material transferred to the intermediate transfer belt or the like is undesirably returned to the image carrier to thereby inhibit accurate formation of an image. If the volume resistivity in the standard state is higher than $10^{16}$ Ωcm or if the surface resistivity in the standard state is higher than $10^{17}$ Ω, the intermediate transfer belt or the like is excessively electrified during transfer of an image composed of the recording material and formed on the image carrier onto the intermediate transfer belt or the like. When such an intermediate belt is separated from the image carrier, discharge phenomenon occurs, and the discharge at the separation causes scattering of the recording material transferred to the intermediate transfer belt or the like, whereby accurate formation of an image is inhibited. In the case of a transfer conveyance belt, discharge through the right side and/or reverse side of the belt does not smoothly proceed so that separation failure of the recording sheet being conveyed is liable to be caused.

In a case where only intermediate transfer is required from a viewpoint of realizing accurate formation of an image with satisfactory transfer of a recording material, a semiconductive belt (a intermediate transfer belt) is preferably composed of a polyimide film having a volume resistivity of $10^9$ Ωcm to $10^{12}$ Ωcm in a standard state. In the case of a semiconductive belt (a transfer conveyance belt) arranged to both transfer an image on the image carrier to a recording sheet provided on the belt and convey the recording sheet having the image transferred, a semiconductive belt is preferably composed of a polyimide film having a volume resistivity of $10^{13}$ Ωcm to $10^{16}$ Ωcm in a standard state from a viewpoint of realizing accurate formation of an image and satisfactory separation of the recording sheet.

The polyimide film may contain an electrically conductive filler, if necessary, to realize the foregoing volume resistivity and the surface resistivity. Examples of the electrically conductive filler include carbon black (e.g., ketchen black or acetylene black); metal (e.g., aluminum or nickel); an oxidized metal compound (e.g., tin oxide); conductive or semi-conductive powder (e.g., potassium titanate) and electrically conductive polymer (e.g., polyaniline or polyacetylene). The electrically conductive filler may be used singly or a mixture of two or more thereof, and is not limited to the above-exemplified materials.

The average particle size of the electrically conductive filler is not limited, but an electrically conductive filler having a small particle size is preferable from a view point of preventing variation of the electric characteristics caused by uneven distribution. The average particle size of the electrically conductive filler (in terms of primary particles) is preferably 5 $\mu$m or smaller, more preferably 3 $\mu$m or smaller and most preferably 5 $\mu$g to 0.02 $\mu$m.

The amount of the electrically conductive filler can be determined arbitrarily depending on the kind, the particle size and the dispersibility of the electrically conductive filler such that the required electric characteristics can be realized. In general, it is preferable that the amount is 25 parts by weight or smaller based on 100 parts by weight of polyimide (a solid component), more preferably from 1 to 20 parts by weight and most preferably from 3 to 15 parts by weight, from a viewpoint of preventing deterioration in the mechanical characteristics of the polyimide film such as the strength.

To maintain the mechanical characteristics of the polyimide film such as the strength, it is preferable that the amount of the electrically conductive filler is minimized. To obtain the above-mentioned electric characteristics with the small amount, carbon black such as ketchen black can be used. In this case, the foregoing electric characteristics can be realized when the amount is smaller than 5 parts by weight, preferably from 1 to 4 parts by weight based on 100 parts by weight of polyimide (the solid component).

The addition of the electrically conductive filler into the polyimide film can be performed according to arbitrary methods. Examples thereof include a method which comprises mixing and dispersing the electrically conductive filler in the solution for preparing polyamic acid by means of an appropriate mixer such as a planetary mixer, a beads mill or a triple-roll mixer, and subjecting the resulting solution to polymerization treatment, and a method which comprises mixing and dispersing or dissolving the electrically conductive filler in a polyamic acid solution prepared in advance by means of an appropriate mixer, and molding the resulting solution into a film.

In case where the electrically conductive filler is mixed in the solution for preparing polyamic acid, from the standpoint of performing uniform dispersion to thereby prevent variation in the electric characteristics, it is preferred to employ a method which comprises dispersing the electrically conductive filler in a solvent by an appropriate means such as a ball mill or ultrasonic waves to prepare a dispersion solution, dissolving tetracarboxylic dianhydride or a derivative thereof and diamine in the dispersion solution, and then effecting the resulting solution to a polymerization treatment.

The polyimide film for forming the semiconductive belt optionally containing the electrically conductive filler according to the present invention preferably has a moisture absorption and swelling coefficient of $2.0/10^5$ cm/cm/% RH or less. This advantageously provides environmental stability of the electric characteristics, that is, the electric characteristics that the amount of change of the surface resistivity between 30° C. and 85% RH and 10° C. and 15% RH in terms of common logarithm is 1.0 or smaller.

That is, the inventors have found a fact that the electric resistance changes largely depending on the change in the environment when it has a large swelling coefficient depending onmoistureabsorption. Thisappears to be because the change in the distance between the electrically conductive fillers due to swelling caused by moisture absorption and contraction caused by drying exerts an influence on the change in the electric resistance. That is, the change in the electric resistance with the change of the environment is largely affected by rather the moisture absorption and swelling coefficient than the moisture absorption rate.

Therefore, the use of polyimide having a small moisture absorption and swelling coefficient is advantageous to prevent change in the electric resistance deriving from change in the environment. The inventors have found that polyimide containing BPDA as a monomer component thereof has a small moisture absorption and swelling coefficient.

The polyimide having the moisture absorption and swelling coefficient of $2.0/10^5$ cm/cm/% RH or smaller can be obtained with the composition in which the amount of the component of BPDA is 50 mol % or greater based on the total amount of acid components. Such a composition can be prepared by arbitrary methods such as a copolymerization method which comprises adding BPDA as tetracarboxylic dianhydride in an amount of 50 mol % or larger in preparing polyamic acid solution or a method which comprises mixing polyamic acid having BPDA as the monomer component and polyamic acid having the other tetracarboxylic dianhydride as the monomer component such that the BPDA component is not lower than 50 mol % based on the total amount of tetracarboxylic dianhydride components.

From the standpoint of the reduction of the moisture absorption and swelling coefficient, a large amount of the BPDA component is preferred. Accordingly, it is preferred to use polyimide prepared from a composition containing the acid component composed of BPDA in an amount of 55 mol % or more, preferably 60 mol % to 100 mol % to form a film. Since the relation between the moisture absorption rate and the moisture absorption and swelling coefficient varies according to the kind of the polymer, it is difficult to find a correlation between the two factors such that one factor can be used to estimate the other factor.

As described above, the polyimide film can be obtained by properly developing polyamic acid solution to form a film. The thickness of the film may be determined arbitrarily according to the purpose of use of the semiconductive belt. From the viewpoint of improving the mechanical characteristics such as strength and flexibility, the thickness is generally from 5 $\mu$m to 500 $\mu$m, preferably from 10 $\mu$m to 300 $\mu$m and most preferably from 20 $\mu$m to 200 $\mu$m.

The semiconductive belt can be obtained by forming the polyimide film having the above-mentioned electric characteristics into a required belt shape. In the case, a polyimide film having a multilayer structure having two or three or more layers, which may be the same layers or different layers, may be employed. If an annular belt is required, the ends of the film can be joined to each other by a proper joining method such as the use of an adhesive. Alternatively, a seamless annular belt may be employed. The seamless annular belt has an advantage that an arbitrary position can be made to be the start point of rotation because of no change in the thickness, whereby a mechanism for controlling the rotation start point can be omitted.

The seamless belt can be molded according to any conventional methods. Examples thereof include a method which comprises developing a polyamic acid solution into an annular shape by coating the polyamic acid solution onto the inner surface or the outer surface of a mold according to a dipping method, a centrifugal method or an application method, or introducing the polyamic acid solution into an injection mold, drying the developed layer to obtain a molding having a required belt shape, heating the molding to convert polyamic acid into imide, and then recovering the resulting molding from the mold as described in JP-A-61-95361, JP-A-64-22514 and JP-A-3-180309. In forming the seamless belt, appropriate processes such as releasing treatment to the mold and defoaming treatment can be effected.

The semiconductive belt according to the present invention can be used in various applications for conventional semiconductive belts. Since the semiconductive belt according to the present invention has excellent mechanical characteristics and electric characteristics, the belt can be preferably used as an intermediate transfer belt for an image of an electrophotographic recording apparatus or a transfer conveyance belt also serving as a transfer belt. In the case, the recording sheet can be any arbitrary sheet for printing such as a paper sheet or a plastic sheet. Also, the recording material for forming an image on the recording sheet can be an arbitrary material which enables the image to adhere to the recording sheet with static electricity.

EXAMPLES

The present invention will be further specifically described by way of, but by no means limited to, following Examples. In the Examples, all parts are by weight.

Example 1

1674 parts of N-methyl-2-pyrrolidone (NMP) and 16.1 parts of dry carbon black (Vulcan XC which is furnace black manufactured by Cabot Co.) were mixed in a ball mill for 6 hours to prepare a uniform dispersion solution. Then, 294.2 parts of 3,3',4,4'-biphenyl tetracarboxylic dianhydride (BPDA) and 108.2 parts of p-phenylene diamine (PDA) were dissolved in the obtained uniform dispersion solution. The resulting solution was stirred at room temperature under nitrogen atmosphere for four hours to effect polymerization reaction. Thus, a polyamic acid solution was obtained.

Then, the polyamic acid solution was applied with a dispenser to the inner surface of a drum-shape mold having an inner diameter of 330 mm and a length of 500 mm to provide a thickness of 400 μm. Then, the drum-shape mold was rotated at 1500 rpm for 10 minutes so that a developed layer having a uniform thickness was formed. Then, hot air having a temperature of 60° C. was blown to the drum-shape mold for 30 minutes from the outside of the drum-shape mold which was being rotated at 250 rpm. Then, the drum was heated at 150° C. for 60 minutes. Then, the temperature was raised to 300° C. at a rate of 2° C./minute, and the temperature was maintained for 30 minutes to not only remove the solvent and water generated by dehydration upon ring closure and but also effect conversion to imide. Then, the material was cooled to the room temperatures, and then removed from the mold. Thus, a seamless semiconductive belt having a thickness of 73 μm to 78 μm was obtained.

Example 2

20 wt % NMP solution, in which 176.5 parts of BPDM/87.2 parts of pyromellitic dianhydride (PMDA) (molar ratio: 6/4) and 200.0 parts of 4,4'-diaminodiphenyl ether (DDE) were dissolved, was stirred for four hours in a nitrogen atmosphere at room temperature to obtain a polyamic acid solution having a viscosity of 2000 poise. The polyamic acid solution and Vulcan XC in a amount of 9.3 parts (corresponding to 2 wt % with respect to polyimide) were kneaded by a triple-roll to prepare a uniform dispersion solution. A seamless semiconductive belt having a thickness of 74 μm to 79 μm was prepared in the same manner as in Example 1 except for using the uniform dispersion solution.

Example 3

A seamless semiconductive belt having a thickness of 76 μm to 80 μm was prepared in the same manner as in Example 1 except that Vulcan XC was added in an amount of 3.5 wt % of polyimide.

Example 4

A seamless semiconductive belt having a thickness of 76 μm to 80 μm was prepared in the same manner as in Example 1 except for using acetylene black (manufactured by Denki Kagaku Kogyo K.K.) and ketchen black (Ketchen Black EC manufactured by Lion Corporation) each in an amount of 3 wt % (total amount: 6 wt %) of the amount of polyimide in place of Vulcan XC.

Example 5

A seamless semiconductive belt having a thickness of 74 μm to 80 μm was prepared in the same manner as in Example 2 except that the molar ratio of BPDA/PMDA was 4/6.

Example 6

A seamless semiconductive belt having a thickness of 74 μm to 80 μm was prepared in the same manner as in Example 1 except that Vulcan XC was added in an amount of 6 wt % of the amount of polyimide.

Example 7

A seamless semiconductive belt having a thickness of 74 μm to 80 μm was prepared in the same manner as in Example 1 except that Vulcan XC was added in an amount of 2.5 wt % of the amount of polyimide.

Evaluation Test

The following characteristic of the semiconductive belts obtained in the foregoing examples were examined.

Volume Resistivity

The volume resistivity at 25° C. and 60% RH was measured by Hiresta IP MCP-HT260 having a HR-100 probe (manufactured by Mitsubishi Petrochemical Co. Ltd.) under the condition that a voltage of 100 V was applied for one minute.

Surface Resistivity and Amount of Change (Δ log)

The surface resistivity at 10° C. and 15% RH, 25° C. and 60% RH (standard state) and 30° C. and 85% RH were was measured by Hi-Rester MCP-HT260 (manufactured by Mitsubishi Peterochemical Co., Ltd. and having a probe: HR-100) under the condition that a voltage of 250 V was applied for one minute. Moreover, an amount of change (Δlog: a–b) of the surface resistivity between 30° C. and 85% RH and 10° C. and 15% RH in terms of common logarithm was 1.0 or smaller. The values a and b were average values.

The above-obtained volume resistivity and surface resistivity correlate to those obtained according to JIS K 6911.

Moisture Absorption and Swelling Coefficient and Moisture Absorption Rate

The semiconductive belt dried at 120° C. for one hour was subject to a moisture absorbing process at 25° C. and 100%

RH for 24 hours. Then, change in the size ($L-L_0=\Delta L$) and that in the weight ($W-W_0=\Delta W$) occurred before moisture absorption ($L_0$, $W_0$) and after moisture absorption (L, W) were detected. Then, results were obtained by the following equation:

$$\text{Moisture Absorption and Swelling Coefficient}=\Delta L/100L_0,$$

$$\text{Moisture Absorption Rate}=\Delta W/W_0\times 100$$

Tensile Strength and Elongation

Tensile strength (speed: 100 mm/minute) and elongation at the time of breakage were measured by using a punched specimen having a width of 5 mm (#3 dumbbell according to JIS K 6301) according to JIS K 7113.

Image Transferring Property and Paper Separability

The semiconductive belt obtained in the foregoing examples was set into a marketed copying machine as an intermediate transfer belt (belt method A) or a transfer conveyance belt (belt method B). Then, printing test was effected by printing 10,000 sheets of plain paper. The environment condition was changed from 10° C. and 15% RH (low temperature and low humidity) to 30° C. and 85% RH (high temperature and high humidity) after 5000 sheets were printed. Samples which provided clear and accurate images and no defect in separation of the paper with respect to 10,000 sheets were evaluated as "good". On the other hand, samples which caused defective transfer or non-clear or inacurate image were evaluated as "poor".

The obtained results were shown in the following table.

combination and arrangement of parts without departing from the spirit and the scope of the invention as hereinafter claimed.

What is claimed is:

1. A semiconductive belt comprising a polyimide film and carbon black as a conductive filler, said film having a moisture absorption and swelling coefficient of $2.0/10^5$ cm/cm/% RH or less, a volume resistivity of $10^9$ Ωcm to $10^{16}$ Ωcm and a surface resistivity of $10^{10}$ Ω to $10^{17}$ Ω at 25° C. and 60% RH, wherein the amount of change of the surface resistivity between 30° C. and 85% RH and 1 0° C. and 15% RH in terms of common logarithm is 1.0 or smaller.

2. The semiconductive belt according to claim 1, whercin said semiconductor belt is composed of a polyimide film having a volume resistivity of $10^9$ Ωcm to $10^{12}$ Ωcm at 25° C. and 60% RH and arranged to serve as an intermediate transfer belt for an electrophotographic recording apparatus.

3. The semiconductive belt according to claim 2, wherein said polyimide film is composed of polyimide prepared from a composition containing 3,3',4,4'-biphenyl tetracarboxylic dianhydride as an acid component in an amount of 50 mol % or larger based on the total amount of acid components.

4. The serniconductive belt according to claim 1, wherein said semiconductive belt is composed of a polyide film having a volume resistivity of $10^{13}$ Ωcm to $10^{16}$ Ωcm at 25° C. and 60% RH and arranged to serve as a transfer conveyance belt for an electrophotographic recording apparatus.

5. The semiconductive belt according to claim 4, wherein said polyimide film is composed of polyimide prepared from

TABLE

| | Example 1 | Example 2 | Example 3 | Example 4 | Example 5 | Example 6 | Example 7 |
|---|---|---|---|---|---|---|---|
| Volume Resistivity (Ωcm) | $(1–5) \times 10^{13}$ | $(1–6) \times 10^{13}$ | $(5–9) \times 10^{15}$ | $(5–9) \times 10^{10}$ | $(1–8) \times 10^{13}$ | $(5–8) \times 10^{12}$ | $(1–5) \times 10^{16}$ |
| Surface Resistivity (Ω: reference) | $(1–4) \times 10^{14}$ | $(1–5) \times 10^{14}$ | $(4–8) \times 10^{16}$ | $(5–8) \times 10^{11}$ | $(1–7) \times 10^{14}$ | $(5–8) \times 10^{13}$ | $(1–5) \times 10^{17}$ |
| Δ log | 0.6 | 0.9 | 0.6 | 0.6 | 1.1 | 0.6 | 0.6 |
| Moisture Absorption and Swelling Coefficient (cm/cm/% RH) | $1.1/10^5$ | $2.0/10^5$ | $1.1/10^5$ | $1.1/10^5$ | $2.1/10^5$ | $1.1/10^5$ | $1.1/10^5$ |
| Moisture Absorption Rate (%) | 1.2 | 1.9 | 1.2 | 1.2 | 2.2 | 1.2 | 1.2 |
| Tensile Strength *1 | 33 | 26 | 35 | 30 | 23 | 31 | 35 |
| Elongation (%) | 24 | 48 | 29 | 20 | 52 | 21 | 27 |
| Belt Method | B | B | B | A | B | B | A |
| Image Transfer | good | good | good | good | poor | poor *2 | good |
| Paper Separation | good | good | good | good | good | good | poor |

*1 unit of tensile strength ($kg/mm^2$)
*2 non-serious defect in image transfer

As can be understood from the table, satisfactory strength and non-elongation characteristic (non-deformation characteristic) of the polyimide film can be maintained, considerable dispersion in the volume resistivity and surface resistivity can be prevented, the surface resistivity cannot easily be changed owing to environment factor, an excellent image can be transferrd to a recording sheet without deformation of the toner image and irregular transfer in a case of an intermediate transfer belt or a transfer conveyance belt of an electrophotographic recording apparatus and a recording sheet, which is being conveyed, can smoothly be separated. The foregoing performance can be maintained for a long time.

Although the invention has been described in its preferred form and structure with a certain degree of particularity, it is understood that the present disclosure of the preferred form can be changed in the details of construction and in the a composition containing 3,3',4,4'-biphenyl tetracarboxylic dianhydride as an acid component in an amount of 50 mol % or larger based on the total amount of acid components.

6. A semniconductive belt comprising a polyimide film comprising carbon black as a conductive filler and polyimide prepared from a composition containing 3,3', 4,4'-biphenyl tetracarboxylic dianhydride as an acid component in an amount of 50 mol % or larger based on the total amount of acid components, said film having a volume resistivity of $10^9$ Ωcm to $10^{16}$ Ωcm, a moisture absorption and swelling coefficient of $2.0/10^5$ cm/cm/% RH or less and a surface resistivity of $10^{10}$ Ω to $10^{17}$ Ω at 25° C. and 60% RH, and wherein the amount of change of the surface resistivity between 30° C. and 85% RH and 10° C. and 15% RH in terms of common logarithm is 1.0 or smaller.

* * * * *